US011843628B2

(12) United States Patent
Fellows et al.

(10) Patent No.: US 11,843,628 B2
(45) Date of Patent: Dec. 12, 2023

(54) CYBER SECURITY APPLIANCE FOR AN OPERATIONAL TECHNOLOGY NETWORK

(71) Applicant: Darktrace Limited, Cambridge (GB)

(72) Inventors: Simon Fellows, Cambridge (GB); Jack Stockdale, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 1122 days.

(21) Appl. No.: 16/278,953

(22) Filed: Feb. 19, 2019

(65) Prior Publication Data

US 2019/0260781 A1 Aug. 22, 2019

Related U.S. Application Data

(60) Provisional application No. 62/632,623, filed on Feb. 20, 2018.

(51) Int. Cl.
*H04L 9/40* (2022.01)
*G06F 21/55* (2013.01)
(Continued)

(52) U.S. Cl.
CPC ........ *H04L 63/1441* (2013.01); *G06F 3/0486* (2013.01); *G06F 3/04842* (2013.01);
(Continued)

(58) Field of Classification Search
CPC . G06N 20/10; H04L 63/1425; H04L 63/1433; H04L 63/1416; H04L 2463/144; G06F 21/55
See application file for complete search history.

(56) References Cited

U.S. PATENT DOCUMENTS

| | | |
|---|---|---|
| 6,154,844 A | 11/2000 | Touboul et al. |
| 6,965,968 B1 | 11/2005 | Touboul |

(Continued)

FOREIGN PATENT DOCUMENTS

| | | |
|---|---|---|
| EP | 2922268 A1 | 9/2015 |
| WO | 2001031420 A2 | 5/2001 |

(Continued)

OTHER PUBLICATIONS

Settani et al., "Protecting cyber physical production systems using anomaly detection to enable self-adaptation," 2018 IEEE Industrial Cyber-Physical Systems (ICPS) Year: 2018 | Conference Paper | Publisher: IEEE.*

(Continued)

*Primary Examiner* — Roderick Tolentino
(74) *Attorney, Agent, or Firm* — Rutan and Tucker, LLP

(57) ABSTRACT

A cyber security appliance has one or more modules to interact with entities in an operational technology network and potentially in an informational technology network. The operational technology module can reference various machine-learning models trained on a normal pattern of life of users, devices, and/or controllers of the operational technology network. A comparator module cooperates with the operational technology module to compare the received data on the operational technology network to the normal pattern of life of any of the users, devices, and controllers to detect anomalies in the normal pattern of life for these entities in order to detect a cyber threat. An autonomous response module can be programmed to respond to counter the detected cyber threat.

20 Claims, 8 Drawing Sheets

Cyber security appliance 100
Trigger Module
Gather Module
IT Module
OT Module
Coordinator Module
Comparison Module
Cyber Threat Module
User Interface Module
Researcher Module
Autonomous Response Module
Data Store
AI model(s)
AI Model IT Network Pattern of Life
AI Model OT Network Pattern of Life
AI Model Potential Cyber Threats
AI Model Normal Pattern of Life
I/O Ports

(51) Int. Cl.

| | |
|---|---|
| ***G06N 20/00*** | (2019.01) |
| ***G06N 20/10*** | (2019.01) |
| ***G06F 21/36*** | (2013.01) |
| ***H04L 43/045*** | (2022.01) |
| ***G06F 16/2455*** | (2019.01) |
| ***G06F 3/04842*** | (2022.01) |
| ***G06F 3/0486*** | (2013.01) |
| ***H04L 41/22*** | (2022.01) |
| ***G06F 40/40*** | (2020.01) |
| ***H04L 51/42*** | (2022.01) |
| ***H04L 51/212*** | (2022.01) |
| ***G06F 18/23*** | (2023.01) |
| ***G06F 18/232*** | (2023.01) |
| ***G06V 30/10*** | (2022.01) |
| ***H04L 51/224*** | (2022.01) |
| *G06N 20/20* | (2019.01) |

(52) U.S. Cl.

CPC .......... *G06F 16/2455* (2019.01); *G06F 18/23* (2023.01); *G06F 18/232* (2023.01); *G06F 21/36* (2013.01); *G06F 21/554* (2013.01); *G06F 21/556* (2013.01); *G06F 40/40* (2020.01); *G06N 20/00* (2019.01); *G06N 20/10* (2019.01); *G06V 30/10* (2022.01); *H04L 41/22* (2013.01); *H04L 43/045* (2013.01); *H04L 51/212* (2022.05); *H04L 51/224* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1425* (2013.01); *H04L 63/1433* (2013.01); *H04L 63/1483* (2013.01); *H04L 63/20* (2013.01); *G06N 20/20* (2019.01)

(56) References Cited

U.S. PATENT DOCUMENTS 7,307,999 B1 12/2007 Donaghey
7,418,731 B2 8/2008 Touboul
7,448,084 B1 11/2008 Apap et al.
8,312,540 B1 11/2012 Kahn et al.
8,819,803 B1 8/2014 Richards et al.
8,879,803 B2 11/2014 Ukil et al.
8,966,036 B1 2/2015 Asgekar et al.
9,043,905 B1 5/2015 Allen et al.
9,106,687 B1 8/2015 Sawhney et al.
9,185,095 B1 11/2015 Moritz et al.
9,213,990 B2 12/2015 Adjaoute
9,401,925 B1 7/2016 Guo et al.
9,516,039 B1 12/2016 Yen et al.
9,516,053 B1 12/2016 Muddu et al.
9,641,544 B1 5/2017 Treat et al.
9,712,548 B2 7/2017 Shmueli et al.
9,727,723 B1 8/2017 Kondaveeti et al.
10,050,987 B1* 8/2018 Mohta .................. H04W 12/12
10,530,749 B1* 1/2020 Park .................... H04L 63/0245
11,689,544 B2* 6/2023 Ciocarlie .............. H04L 67/535 726/23
2002/0186698 A1 12/2002 Ceniza
2003/0070003 A1 4/2003 Chong et al.
2004/0083129 A1 4/2004 Herz
2004/0167893 A1 8/2004 Matsunaga et al.
2005/0065754 A1 3/2005 Schaf et al.
2007/0118909 A1 5/2007 Hertzog et al.
2007/0294187 A1 12/2007 Scherrer
2008/0005137 A1 1/2008 Surendran et al.
2008/0109730 A1 5/2008 Coffman et al.
2009/0106174 A1 4/2009 Battisha et al.
2009/0254971 A1 10/2009 Herz et al.
2010/0009357 A1 1/2010 Nevins et al.
2010/0095374 A1 4/2010 Gillum et al.
2010/0125908 A1 5/2010 Kudo
2010/0235908 A1 9/2010 Eynon et al.
2010/0299292 A1 11/2010 Collazo
2011/0093428 A1 4/2011 Wisse
2011/0213742 A1 9/2011 Lemmond et al.
2011/0261710 A1 10/2011 Chen et al.
2012/0096549 A1 4/2012 Amini et al.
2012/0137367 A1 5/2012 Dupont et al.
2012/0209575 A1 8/2012 Barbat et al.
2012/0210388 A1 8/2012 Kolishchak
2012/0284791 A1 11/2012 Miller et al.
2012/0304288 A1 11/2012 Wright et al.
2013/0054783 A1* 2/2013 Ge ...................... H04L 43/0823 709/224
2013/0091539 A1 4/2013 Khurana et al.
2013/0198119 A1 8/2013 Eberhardt, III et al.
2013/0198840 A1 8/2013 Drissi et al.
2013/0254885 A1 9/2013 Devost
2013/0305357 A1 11/2013 Ayyagari et al.
2014/0007237 A1 1/2014 Wright et al.
2014/0074762 A1 3/2014 Campbell
2014/0165207 A1 6/2014 Engel et al.
2014/0215618 A1 7/2014 Amit
2014/0325643 A1 10/2014 Bart et al.
2015/0067835 A1 3/2015 Chari et al.
2015/0081431 A1 3/2015 Akahoshi et al.
2015/0161394 A1 6/2015 Ferragut et al.
2015/0163121 A1 6/2015 Mahaffey et al.
2015/0172300 A1 6/2015 Cochenour
2015/0180893 A1 6/2015 Im et al.
2015/0213358 A1 7/2015 Shelton et al.
2015/0286819 A1 10/2015 Coden et al.
2015/0310195 A1 10/2015 Bailor et al.
2015/0319185 A1 11/2015 Kirti et al.
2015/0341379 A1 11/2015 Lefebvre et al.
2015/0363699 A1 12/2015 Nikovski
2015/0379110 A1 12/2015 Marvasti et al.
2016/0062950 A1 3/2016 Brodersen et al.
2016/0078365 A1 3/2016 Baumard
2016/0149941 A1 5/2016 Thakur et al.
2016/0164902 A1 6/2016 Moore
2016/0173509 A1 6/2016 Ray et al.
2016/0241576 A1 8/2016 Rathod et al.
2016/0352768 A1 12/2016 Lefebvre et al.
2016/0373476 A1 12/2016 Dell'Anno et al.
2017/0063907 A1 3/2017 Muddu et al.
2017/0063910 A1 3/2017 Muddu et al.
2017/0063911 A1 3/2017 Muddu et al.
2017/0169360 A1 6/2017 Veeramachaneni et al.
2017/0220801 A1 8/2017 Stockdale et al.
2017/0230391 A1 8/2017 Ferguson et al.
2017/0230392 A1 8/2017 Stockdale
2017/0230410 A1* 8/2017 Hassanzadeh ......... G06N 20/00
2017/0251012 A1 8/2017 Stockdale et al.
2017/0270422 A1 9/2017 Sorakado
2018/0027006 A1 1/2018 Zimmermann et al.
2018/0167402 A1 6/2018 Scheidler et al.
2018/0234302 A1* 8/2018 James .................... G06N 20/00
2019/0089722 A1* 3/2019 Ciocarlie ............ H04L 63/1408
2019/0132358 A1* 5/2019 DiValentin .......... H04L 63/1416
2019/0141058 A1* 5/2019 Hassanzadeh ...... H04L 41/0631
2019/0236177 A1* 8/2019 Jain ..................... G06F 16/2365

FOREIGN PATENT DOCUMENTS

WO 2008121945 A2 10/2008
WO 2013053407 A1 4/2013
WO 2014088912 A1 6/2014
WO 2015027828 A1 3/2015
WO 2016020660 A1 2/2016

OTHER PUBLICATIONS

Sarkar et al., "VOTNET: Hybrid Simulation of Virtual Operational Technology Network for Cybersecurity Assessment," 2018 Winter Simulation Conference (WSC) Year: 2018 | Conference Paper | Publisher: IEEE.*

(56) References Cited

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

European Patent Office, European Search Report, dated Jul. 15, 2019, pp. 8.

* cited by examiner

CYBER SECURITY APPLIANCE FOR AN OPERATIONAL TECHNOLOGY NETWORK

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system.

BACKGROUND

The Operational Technology (OT) systems, such as Industrial Control Systems (ICS), are computer networks used to monitor and control industrial systems. They are critical to major manufacturing and critical infrastructure. Cyber threats, misconfigurations and malfunctions are currently incredibly costly to remediate in OT environments due to the large scale and complex nature of the network topology and associated devices.

ICS environments are most commonly a mixture of Personal Computing systems and specialized hardware such as Programmable Logic Controllers (PLCs). PLCs are often employed as a bridge between the network and the physical process and consequently, PLCs are connected to non-networking equipment such as pressure sensors or motors. PLCs and other OT specific devices are extremely vulnerable to cyber-attacks due to their architecture and exposure to the IT zone where traditional cyber threats are located.

SUMMARY

In an embodiment, a cyber security appliance can have one or more modules that utilize probes to interact with entities in the OT network and potentially in an informational technology network. An OT module can receive data on an operational technology network from i) a set of probes, ii) by passive traffic ingestion through a location within the network, and iii) any combination of both.

The OT module can also reference various machine-learning models. The OT module can reference one or more machine-learning models, using machine-learning and AI algorithms, that are trained on a normal pattern of life of users of the OT network. The OT module can reference one or more machine-learning models, using machine-learning and AI algorithms, that are trained on a normal pattern of life of devices in the OT network. The OT module can reference one or more machine-learning models, using machine-learning and AI algorithms, that are trained on a normal pattern of life of controllers in the OT network.

A comparator module cooperates with the OT module to compare the received data on the OT network to the normal pattern of life of any of the users, devices, and controllers to detect anomalies in the normal pattern of life for these entities in order to detect a cyber threat.

An autonomous response module configured to autonomously respond to counter the cyber threat, and a user interface to program the autonomous response module.

These and other features of the design provided herein can be better understood with reference to the drawings, description, and claims, all of which form the disclosure of this patent application.

BRIEF DESCRIPTION OF THE DRAWINGS

The multiple drawings refer to the embodiments of the invention.

Figure 1:
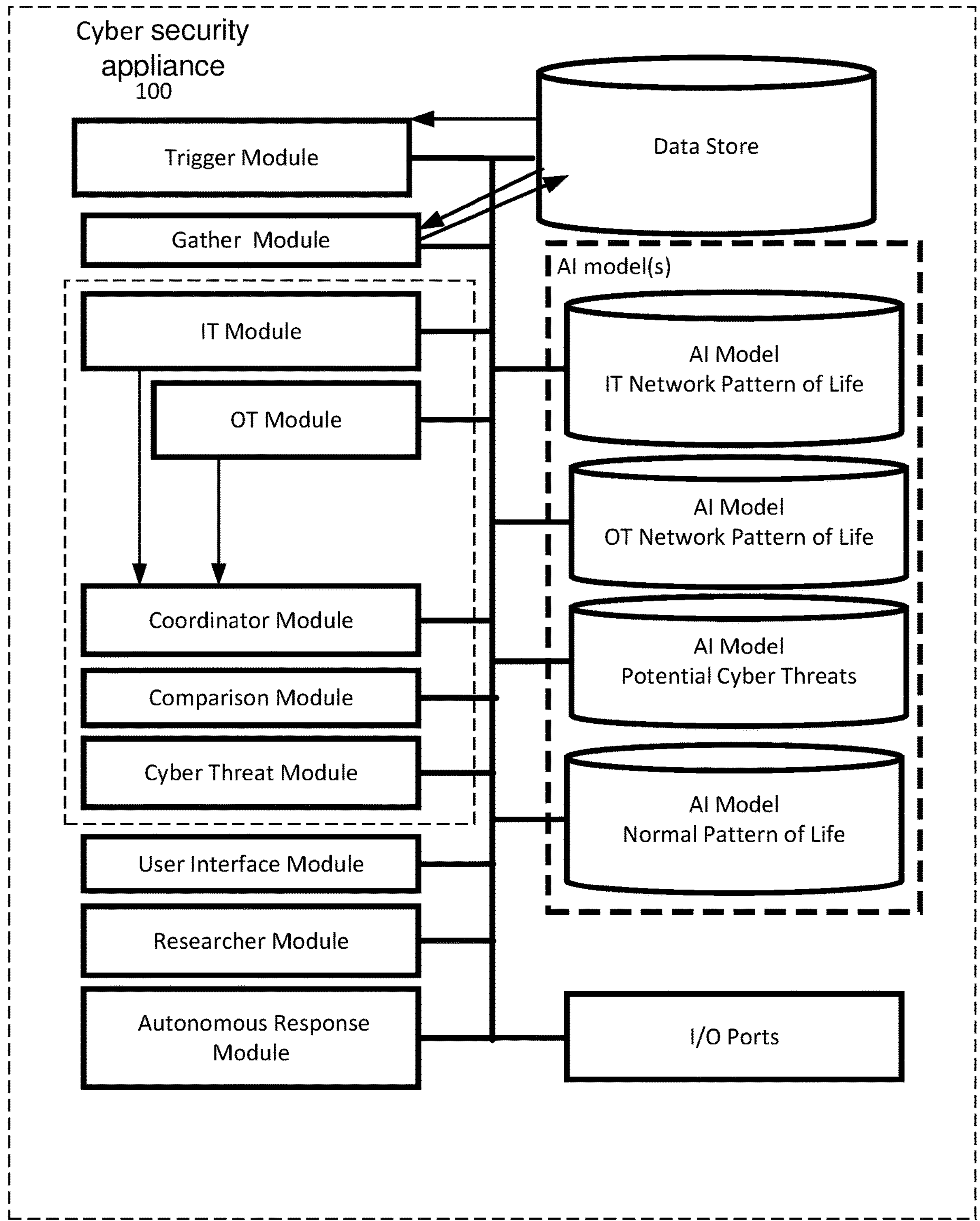
FIG. 1 illustrates a block diagram of an embodiment of a cyber security appliance with various modules that reference machine-learning models that are trained on the normal pattern of life of entities to detect a cyber threat.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber security appliance may use AI to analyze cyber security threats. The cyber security appliance has one or more modules to interact with entities in an OT network and potentially in an informational technology network. The OT module can reference various machine-learning models trained on a normal pattern of life of users, devices, and/or controllers of the OT network. A comparator module cooperates with the OT module to compare the received data on the OT network to the normal pattern of life of any of the users, devices, and controllers to detect anomalies in the normal pattern of life for these entities in order to detect a cyber threat. An autonomous response module can be programmed to respond to counter the detected cyber threat.

FIG. 1 illustrates a block diagram of an embodiment of a cyber security appliance with various modules that reference machine-learning models that are trained on the normal pattern of life of entities to detect a cyber threat. The cyber security appliance may protect against cyber security threats from the OT network as well as potentially from an informational technology network.

The cyber security appliance 100 may include components such as i) a trigger module, ii) a gather module, iii) a data store, iv) a GUI module, v) an OT module, vi) an informational technology module, vii) a coordinator module, vii) a comparison module, ix) a cyber threat module, x) a researcher module, xi) an autonomous response module, xii) at least one input or output (I/O) port to securely connect to other network ports as required, xiii) one or more machine-learning models such as a first AI model trained one or more aspects of an OT network, a second AI model trained on aspects of an informational technology network, a third AI model trained on potential cyber threats, and additional AI models, each trained on different users, devices, system activities and interactions between entities in the system, and other aspects of the system, as well as xiv) other similar components in the cyber security appliance 100. The one or more modules may be situated within the network to passively ingest entity traffic or utilize probes to interact with entities in the OT network and the informational technology network.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of anomalies such as i) an abnormal behavior, ii) a suspicious activity, and iii) any combination of both. The inline data may be gathered on the deployment from a data store when the traffic is observed. The scope and wide variation of data available in the data store results in good quality data for analysis. The collected data is passed to the various modules as well as to the data store.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation occurs between the gather module, the OT module monitoring OT activity, the informational technology module monitoring informational technology activity, the comparison module to apply one or more models trained on different aspects of this process, and the cyber threat module to identify cyber threats based on comparisons by the comparison module. Each hypothesis of typical cyber threats can have various supporting points of data and other metrics associated with that possible threat, such as a human user insider attack, inappropriate network behavior, inappropriate behavior in the OT network, inappropriate cloud behavior, etc. from a human user. The hypothesis of typical cyber threats to be supported or refuted also includes a malicious software or malware attack that causes inappropriate informational technology, inappropriate OT behavior, etc. A machine-learning algorithm will look at the relevant points of data to support or refute that particular hypothesis of what the suspicious activity or abnormal behavior related for each hypothesis on what the suspicious activity or abnormal behavior relates to.

Networks have a wealth of data and metrics that may be collected. The gatherer modules may then filter or condense the mass of data down into the important or salient features of data. In an embodiment, the informational technology module, the OT module, comparison module, the coordinator module, the cyber threat module can be combined or kept as separate modules.

The OT module can receive data on an operational technology network from i) a set of probes, ii) by passive traffic ingestion through a location within the network, and iii) any combination of both, whether located within the cyber threat defense appliance or located on the wider network. The OT module can reference various machine-learning models. The OT module can reference one or more machine-learning models, using machine-learning and AI algorithms, that are trained on a normal pattern of life of users of the OT network. The OT module can also reference one or more machine-learning models, using machine-learning and AI algorithms, that are trained on a normal pattern of life of devices in the OT network. The OT module can also reference one or more machine-learning models, using machine-learning and AI algorithms, that are trained on a normal pattern of life of OT environment specific entities such as Programmable Logic Controllers, Human Machine Interfaces, and the detailed process control communications between them.

A comparator module can compare the received data on the OT network to the normal pattern of life of any of the users, devices, and controllers to detect anomalies in the normal pattern of life for these entities in order to detect a cyber threat.

Note, once the normal pattern of life has been learned by the models, then the OT module and/or comparator module can readily identify the anomalies in the normal pattern of life; and thus, unusual behaviors from the devices, users, or controllers of the OT network.

An informational technology module can monitor data from an informational technology network. The informational technology module can receive data on an informational technology network from another set of probes. The informational technology module can reference one or more machine-learning models that are trained on a normal behavior of at least one or more entities associated with the informational technology network; and thus, be able to indicate when a behavior of the given entity falls outside of being a normal pattern of life.

Note, once the normal pattern of life has been learned by the models, then the informational technology module and/or comparator module can readily identify the anomalies in the normal pattern of life; and thus, unusual behaviors from the devices, users, or controllers of the IT network.

The OT environment is not restricted to OT-specific devices and protocols and vice versa. Commonly, IT devices and services are located with OT environments for purposes such as cross-compatibility, specific control procedures or other. Equally, traditionally OT hardware may be located within an IT network such as scientific equipment or specialized analysis devices. Devices may also move between OT and IT based upon their implementation purposes, such as an IT server running OT software or coordinating OT protocols. It is important to note that the OT module and IT module are not restricted to specific networks, the OT module may still analyze the pattern of life for the OT device located in a computer lab within the IT network. Similarly, the OT and IT modules are not restricted by device type. The IT module may therefore monitor the pattern of life for that OT device within the aforementioned computer lab as it pertains to the IT network. This is achieved through a coordinator module operating between the OT module and IT module.

A coordinator module can analyze and integrate both activities occurring in the OT network as well as activities occurring in the informational technology network at the same time when analyzing the detected anomalies in the normal pattern of life in order to detect the cyber threat.

A GUI can display metrics, alerts, and events of both the OT network in light of activities occurring in information technology network on a common display screen. The GUI allows a viewer to visually contextualize the metrics, alerts, and/or events occurring in the OT network in light of the activities occurring in the information technology network on the common display screen, The GUI also allows a viewer to then to confirm the detected cyber threat in view of what is happening in the OT network as well as in the information technology network. Visibility over the OT network in this manner can be advantageous even when a cyber threat is not detected, as malfunctions or misconfigurations in the production process can be viewed in the same manner.

A cyber threat module can compare a chain of one or more of the detected anomalies by referencing one or more machine-learning models trained on, at least, the cyber threat. Multiple machine-learning models may be trained, each model trained on a category of cyber threats and its corresponding members or each model trained on its own specific cyber threat. The cyber threat module cooperates and communicates with the other modules. Likewise, the OT module as well as the information technology module cooperates and communicates with the other modules.

The cyber security appliance 100 may supplement the data provided to the users and cyber professionals using a researcher module. The researcher module can use one or more AI algorithms to assess whether the anomalous network activity has previously appeared in other published threat research or known lists of malicious files or Internet addresses. The researcher module can consult internal threat databases or external public sources of threat data. The researcher module can collect an outside data set describing at least one of an action or a state related to the cyber threat present outside of the network from at least one data source outside the network.

The cyber security appliance 100 can then take actions in response to counter detected potential cyber threats. The autonomous response module, rather than a human taking an action, can be configured to cause one or more rapid autonomous actions in response to be taken to counter the cyber threat.

A user interface for the response module can program the autonomous response module i) to merely make a suggested response to take to counter the cyber threat that will be presented a display screen and/or sent by a notice to an administrator for explicit authorization when the cyber threat is detected or ii) to autonomously take a response to counter the cyber threat without a need for a human to approve the response when the cyber threat is detected. The autonomous response module will then send a notice of the autonomous response as well as display the autonomous response taken on the display screen.

The cyber threat module can cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The cyber security appliance 100 may be hosted on a computing device, on one or more servers, or in its own cyber threat appliance platform.

Figure 2:
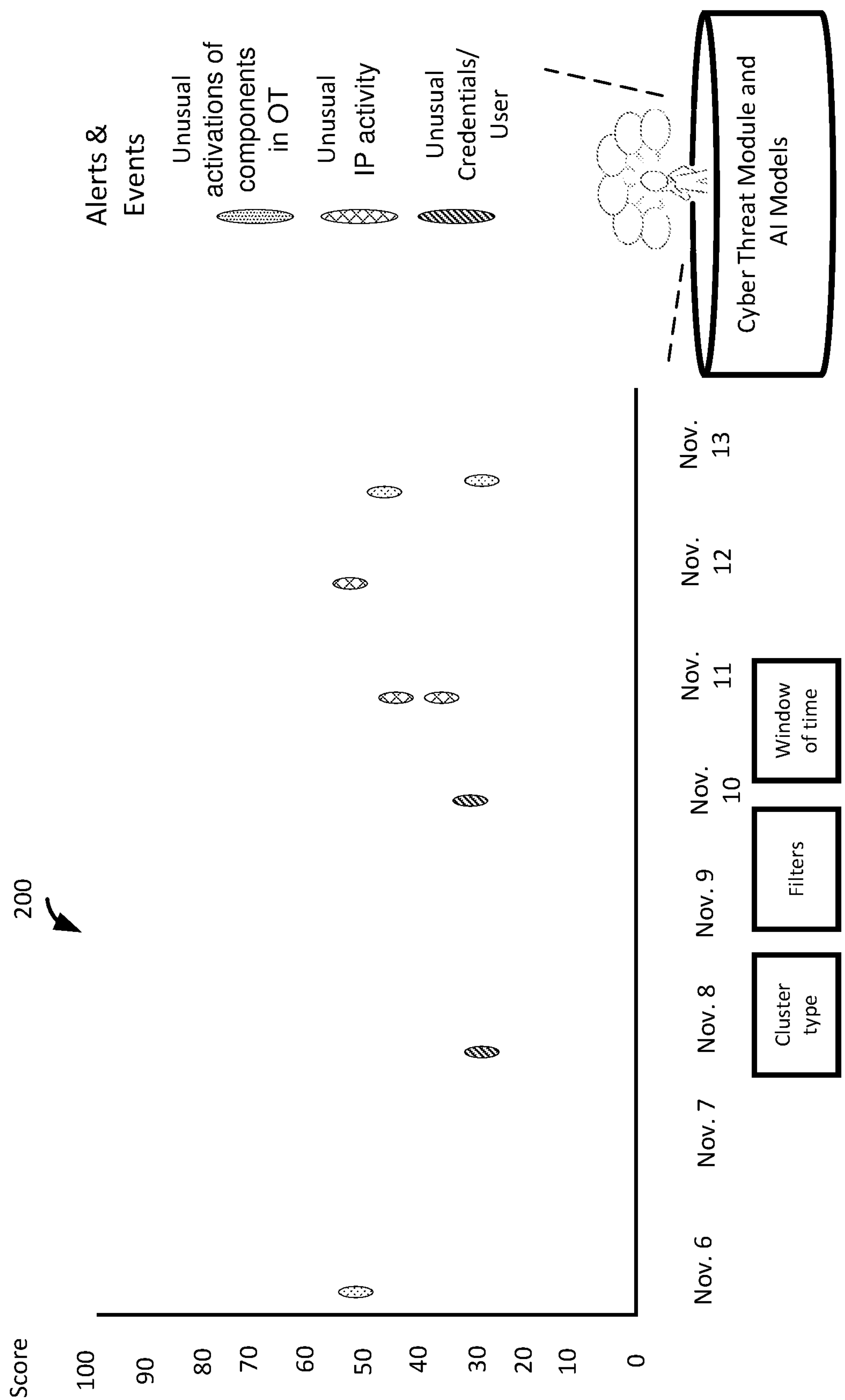
FIG. 2 illustrates a block diagram of an embodiment of an example chain of unusual behavior for the OT network under analysis.

FIG. 2 illustrates a block diagram of an embodiment of an example chain of unusual behavior for the OT network under analysis. The user interface can display a graph 200 of an example chain of unusual behavior for an OT platform in connection with the rest of the network under analysis.

The cyber threat module cooperates with one or more machine-learning models. The one or more machine-learning models are trained and otherwise configured with mathematical algorithms to infer, for the cyber threat analysis, 'what is possibly happening with the chain of distinct alerts and/or events, which came from the unusual pattern of behaviors,' and then assign a threat risk parameter associated with that distinct item of the chain of alerts and/or events forming the unusual pattern.

This is 'a behavioral pattern analysis' of what are the unusual behaviors of the entity under analysis by the various modules and the machine-learning models. The modules of the cyber security appliance 100 determine unusual behavior deviating from the normal behavior and then build a chain of unusual behavior and the causal links between the chain of unusual behavior to detect potential cyber threats.

The one or more machine-learning models learn the similarities of behavior in groups of people and devices and can recognize that a person or device is no longer behaving like the group it is perceived to be a member of.

An example behavioral pattern analysis of what are the unusual behaviors may be as follows. The unusual pattern may be determined by filtering out what activities, events, alerts, etc. that fall within the window of what is the normal pattern of life for that entity under analysis. Once the normal pattern of life has been learned, then the system is capable of identifying unexpected or unusual behaviors from devices or operators of devices. The pattern of the deviant behavior of the activities, events, alerts, etc. that are left, after the filtering, can be analyzed to determine whether that pattern is indicative of a behavior of a malicious actor, such as a human, a program, an email, errant programming or configuring of a component, or other threat. The cyber security appliance 100 can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The cyber security appliance 100 detects a chain of anomalous behavior of unusual activations of components three times, unusual characteristics occur 3 times in Transmission Control Protocol/Internet Protocol (TCP/IP) activity in the gateway feeding each of the components being activated; and thus, seem to have some causal link to the unusual activations. Likewise, twice unusual credentials have a causal link to at least one of those three activations. When the behavioral pattern analysis of any individual behavior or of the chain as a group is believed to be indicative of a malicious threat, then a score of how confident the cyber security appliance 100 is in this assessment of identifying whether the pattern was unusual given the contextual factors and pattern of life analysis is created.

An additional point to note is that the OT module and informational technology module referencing their respective machine-learning models perform filtering to isolate what is unusual for the highest level of analysis. This means a large amount of data can be excluded at every level which greatly reduces the amount of calculations needed on a continuous basis. This also speeds up the analysis to allow near real time analysis of unusual behaviors occurring and being able to rapidly determine if those unusual behaviors actually correlate to a potential cyber threat.

Next, also the cyber threat module can assign a threat level parameter (e.g. score or probability) indicative of what level of threat does this malicious actor pose to the system. These can be combined/factored into a single score. The score may be an actual score, a percentage, a confidence value, or other indicator on a scale. As discussed, the cyber security appliance 100 is configurable in its user interface of the cyber security appliance 100 on what type of automatic response actions, if any, the cyber security appliance 100 may take when for different types of cyber threats that are equal to or above a configurable level of threat (threat level parameter) posed by a detected malicious actor/cyber threat.

The OT module, cyber threat module, and informational technology module referencing their respective machine-learning models are capable of learning what 'normal' activity looks like within an example industrial network, and can identify and respond to emerging threats and potential malfunctions that would otherwise go unnoticed.

The cyber threat module, informational technology module, and an OT module are built on a foundation of machine-learning and AI algorithms, and cooperate to analyze complex network environments to detect indicators of threats against the 'pattern of life' that characterizes each network, device, and user. By identifying unexpected anomalies in behavior, the cyber defense appliance autonomously defends against all threat types from advanced malware to insider threat and IoT hacks, as they emerge, at the earliest stage of the attack life cycle.

The cyber threat module referencing the one or more machine-learning models trained on potential cyber threats recognizes associated chains of behaviors for example: an attack begins by subverting a public relations officer's laptop in a corporate environment, the attack spreads to computer systems in the procurement division, the procurement division is able to access stock/supply information in the operational environment and the attack spreads into this industrial arena. The attack begins to manipulate the industrial environment with the potential for future harm. All stages of this attack can be identified by the OT module, cyber threat module, and informational technology module referencing their respective machine-learning models and presented together in context to a security professional.

The cyber threat module can present its summarized findings on the GUI to enable further human investigation into the detailed attack/unusual behavior.

The cyber threat module can use the machine-learning models to flag activities that indicate a compromise or ongoing threat when they represent a significant departure from the normal behavior.

The cyber threat module can highlight unusual use of access rights, such as the unusual reprogramming of control system devices by an administrator. The cyber threat module provides visibility of weak or compromised authentication in use, as well as attacks on authentication systems. The cyber threat module can highlight system reconnaissance, particularly of control systems, from external or compromised internal devices which may be indicative of the beginning of a malware attack. The cyber threat module highlights activity of new and unknown malware within the network. The cyber threat module can help identify misconfigurations that affect resilience, and highlight attacks on key administrative interfaces. The cyber threat module can highlight unusual connectivity or data transfer within the OT network, between the OT and IT network and between the OT network and third-party locations such as the internet or networks administrated by suppliers.

The cyber threat module communicating the autonomous response module can be programmed to prevent this unauthorized access to data whether through unauthorized access to user devices, interception of data in transit, or by other means. The modules can maintain confirmation of the use of encryption where it is wanted, and highlight unusually weak or missing encryption.

Creating powerful 'pattern of life' models of every individual and device on your network allows the cyber threat module to detect even subtle shifts in behaviors, such as the way someone is using technology, a machine's data access patterns or trends in communications. This may indicate any number of potentially threatening events, such as the theft of a user's credentials, a compromised device, or the actions of a disaffected or negligent employee.

Note, the unusual behavior might be a result of misconfiguration, accidental use, malicious use by a legitimate operator, or malicious use by a third party. The industrial immune system has no prior assumptions and is capable of learning about the behavior of any device or person in corporate or industrial environments. The industrial immune system uses many different machine-learning/AI techniques that compete to learn the best possible pattern of life for individual devices/people or subsets of their behavior.

Note, the one or more models trained on the 'pattern of life' can use a subset of machine-learning algorithms. Also, these machine-learning models can use self-learning algorithms and mathematics to start working from day one, detecting anomalous behaviors across the organization. The machine-learning models using the self-learning algorithms continue to learn on an ongoing basis—constantly updating as the networks of the organization evolve. Thus, the cyber security appliance 100, as a self-learning technology, is extremely quick to deploy, and does not require a long roll-out project or manual intervention to maintain.

Figure 3:
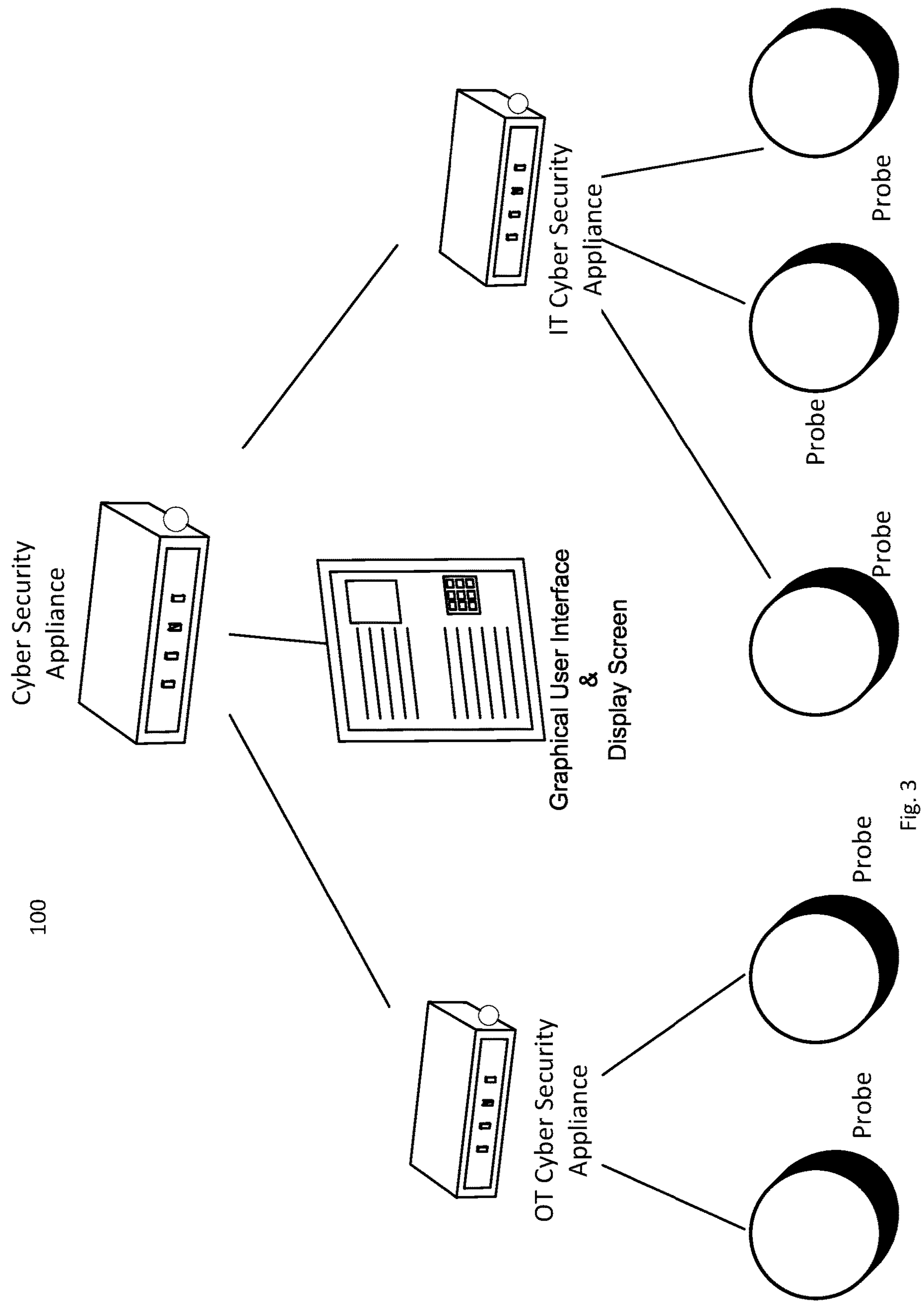
FIG. 3 illustrates a block diagram of an embodiment of using multiple cyber security appliances on an example OT network in connection with the informational technology network under analysis.
Figure 4:
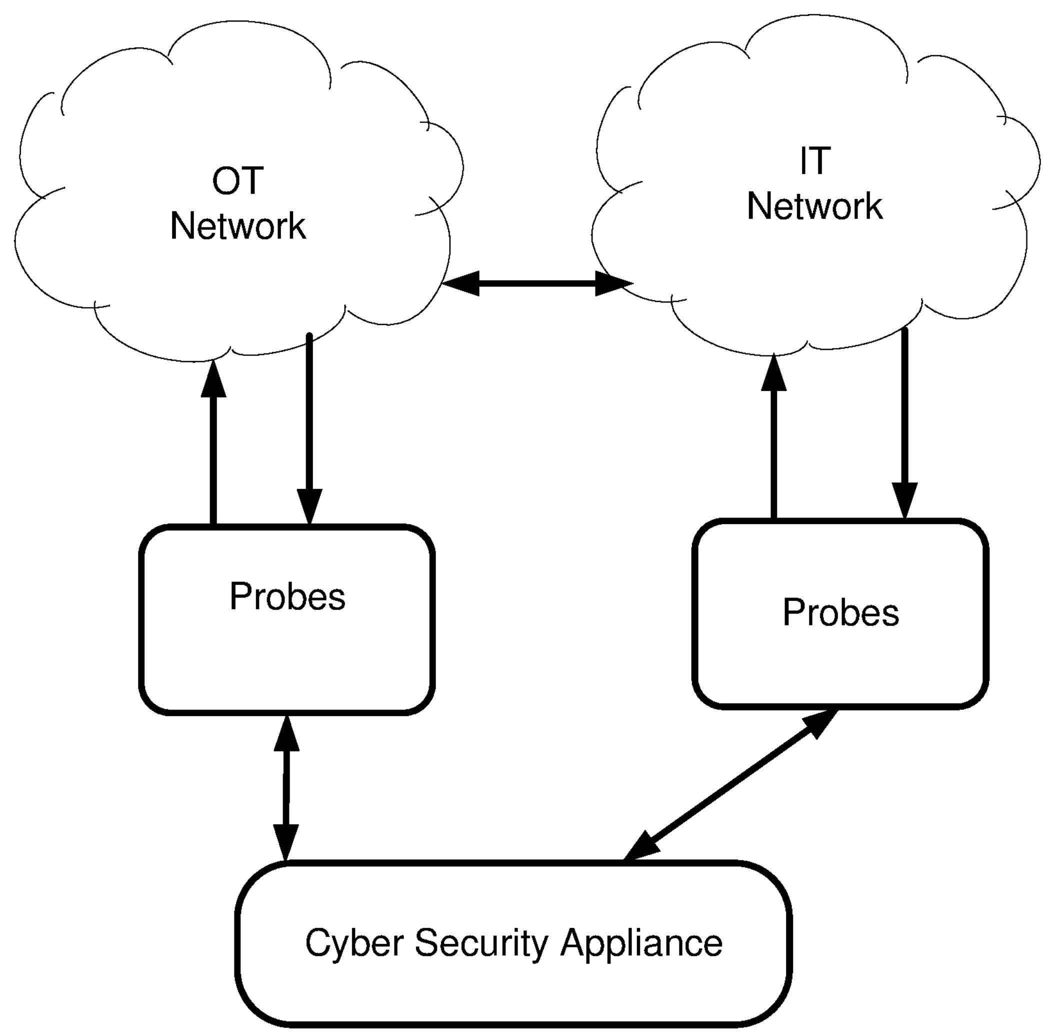
FIG. 4 illustrates a block diagram of an embodiment of an example central cyber security appliance with its modules and machine-learning models using probes to monitor the informational technology network and the OT network.

FIG. 3 illustrates a block diagram of an embodiment of using multiple cyber security appliances on an example OT network in connection with the informational technology network under analysis. FIG. 3 shows a separate informational technology cyber security appliance 100 with its modules and machine-learning models installed in an informational technology network, and a separate OT cyber security appliance 100 with its modules and machine-learning models installed in an OT network, and their inputs being combined in a central cyber security appliance 100. Similarly, FIG. 4 illustrates a block diagram of an embodiment of an example central cyber security appliance 100 with its modules and machine-learning models using probes to monitor the informational technology network and the OT network.

Organizations rely on both their OT networks and their business information technology networks in order to deliver services. The modules of the cyber security appliance 100 are able to analyze activities in both OT networks in light of activities occurring in information technology networks and then display both of their metrics, alerts, and events from each OT and informational technology network being monitored on a common display user interface. The graphical user-interface can be configured to be able to pivot between the metrics of the OT network and the information technology network. The structure and operation of cyber defense for both networks is made possible by the cyber security appliance 100.

The cyber security appliance 100 with the OT module and the informational technology module can detect cyber threats occurring in both an OT network and an information technology network as well as a cyber threat entering in one network and then affecting the other network environment.

The OT module and informational technology module can cooperate to integrate both activities occurring in the OT network as well as activities occurring in the informational technology network on the GUI at the same time. The OT module and informational technology module integrate countering and monitoring the OT infrastructure and components in the informational technology infrastructure with i) machine-learning models and ii) being able to analyze both networks on the GUI and iii) with the various modules, all at the same time.

An OT network typically includes IP and Ethernet-based areas, but may also use other transports. An IP gateway is a device that converts traffic intended for the OT environment travelling over a TCP/IP network into an alternative media such as the Serial Communication protocol, and will also serve as a routing device. An example gateway device would have a single IP address and be contacted using, for example, the Modbus/TCP protocol. Coming out of the other side could be a dozen Serial lines (RS-485), which carry a serial-based protocol. Application layer information within the TCP/IP network traffic includes any additional information needed by the gateway to route data to the correct non-IP device.

The cyber security appliance 100 can merely receive a copy of the IP traffic. In order to disambiguate between the final destinations of the traffic, the communications messaging detector can deep-read the addressing from inside the packets. No matter how many remaining hops the traffic may have to make, the final address must be encoded in the IP traffic. The communications messaging detector is configured to understand OT protocols that use IP networking technologies as well as TCP/IP network communications in order to also provide visibility into OT devices that are not attached to the TCP/IP network, as long as their communications enter the TCP/IP network at some point.

The cyber security appliance 100 is effective across the whole organization, including OT and informational technology networks. The cyber security appliance 100 allows an organization's security team to have a common solution, common capabilities and a common language for exchanging information.

Thus, the cyber security appliance 100 is a self-learning attack detection system that operates across the entirety of corporate and industrial mechanisms (ICS/SCADA/etc.) in an organization e.g. the entirety of the heavy industry and corporate informational technology facilities, of for example, a nuclear power station or a chocolate factory.

Figure 5:
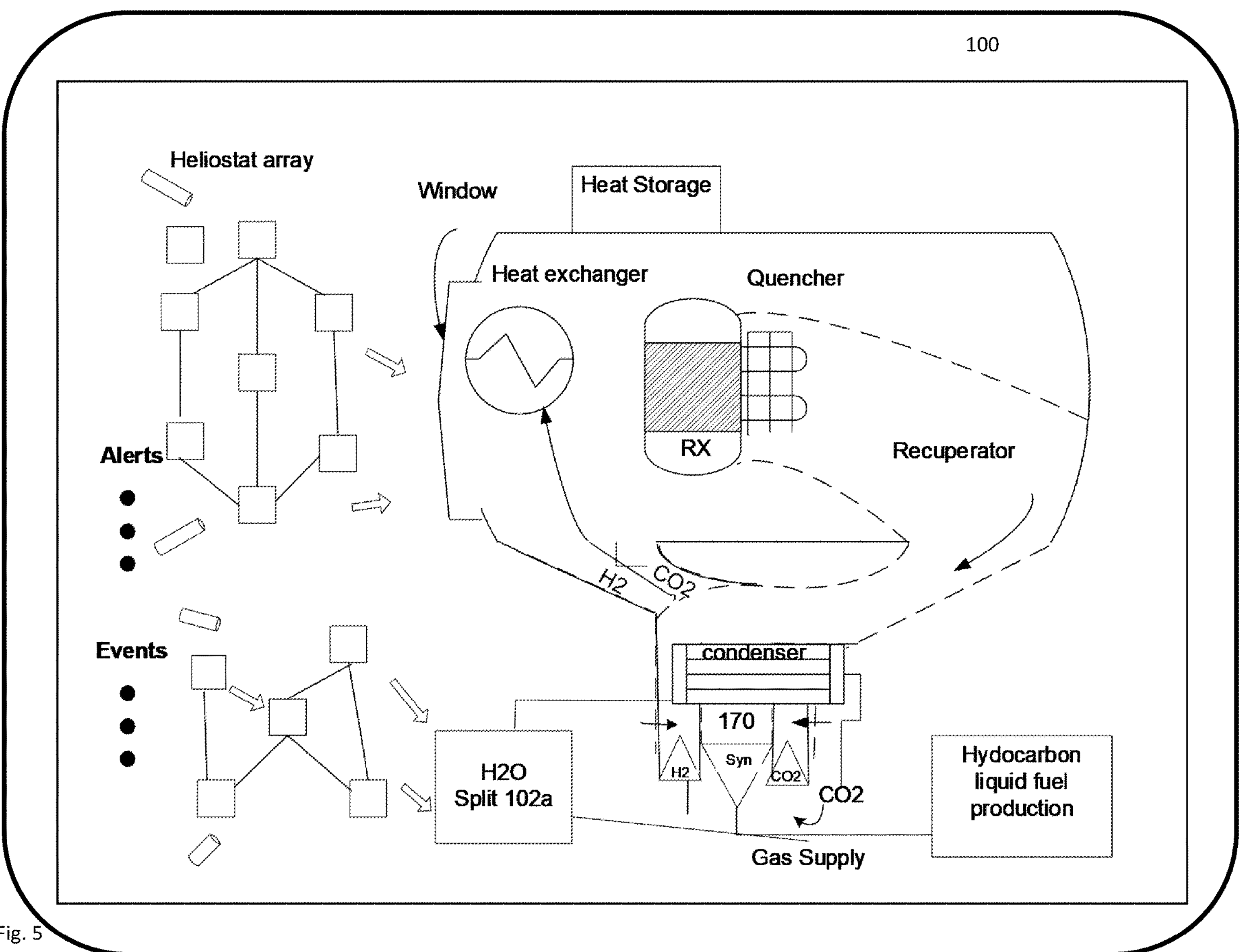
FIG. 5 illustrates a block diagram of an embodiment of an example OT network under analysis as displayed by an embodiment of a GUI.

FIG. 5 illustrates a block diagram of an embodiment of an example OT network under analysis as displayed by an embodiment of a GUI. The OT module is powered by AI learns the 'pattern of life' for every controller and workstation on the control network, and every user and device on the OT network, developing a rich understanding of 'self' for the entire environment. This evolving understanding of 'normal' enables the cyber security appliance 100 to detect the earliest indicators of an emerging threat, without relying on rules, signatures, or prior assumptions.

The OT module can reference the one or more machine-learning models using machine-learning and AI algorithms. The machine-learning models are capable of learning what 'normal' activity looks like within the OT networks, such as industrial networks, and through cooperation with the modules can identify and respond to emerging threats that would otherwise go unnoticed. Note, one or more 'pattern of life' models can be created for every device, user and controller in the OT network to detect subtle shifts in behaviors.

The OT module cooperating with the probes can use a port mirroring functionality of existing switches or fail-safe network taps, so that copies of the data are sent to the cyber security appliance 100 for processing. The probes allow the cyber security appliance 100 to not have to sit in-line.

Some example OT networks can include: Industrial networks; Product Manufacturing (TVs, Cars, etc.); Food & Pharmaceuticals; Utilities (such as energy generation & distribution); Maritime & logistics; Industrial design; Oil & Gas, Building Management, Transport, among others.

The cyber security appliance 100 is able to monitor an industrial network with no disruption to normal functioning of ICS operations, including plants and machinery, and can avoid interfering with critical control communication unless explicitly permitted to perform autonomous actions by user operator. The OT module can be configured to analyze and understand OT protocols at the application layer. Some examples of specialized, OT protocols include: Modbus, DNP3 and CIP. Thus, a communications messaging detector can analyze and understand at least content and fields in two or more of i) a data link protocol, ii) a network protocol, iii) a transport protocol, iv) a session protocol, and v) application layers of networking protocols used in operational technology networks as well as vi) those protocols shared by and used by information technology networks.

The cyber security appliance 100 also works very effectively on all forms of network communications, whether encrypted or not. The OT module and informational technology module can merely analyze meta data on encrypted communication to infer a normal pattern of life. As such, the cyber security appliance 100 is able to cover all OT communications that use IP or Ethernet networking technologies.

Using cutting-edge visualization techniques, the GUI, such as a threat visualizer user interface, automatically alerts viewers to significant incidents and threats within their OT environment, enabling them to proactively investigate specific areas of the ICS. The GUI provides viewers with insights into the relationships and data flows across the network, in real time delivering an instant overview of day-to-day network activity. By leveraging the GUI, operators can see what is happening in their control systems by the GUI visually representing both individual and peer behavior. This works at a high level, identifying diverse threats and anomalies for the operator's attention, and at a more granular level, allowing them to drill down within displayed on items on the GUI and view specific clusters of activity, zones, and PLCs.

The GUI cooperating with the informational technology module, OT module, and cyber threat module provides the visibility to move beyond static security configurations such as whitelists—or displayed simply lists of numbers for particular components, which allows security teams to see the assets in use, visualize the network structure, and examine the detailed data flows in real time on, for example, a three dimensional GUI that shows network components and commands that those network components are receiving when the abnormal behavior is detected. The GUI's visibility of the network allows the identification and tracking of device assets, data movements, software communications and network utilities. The GUI cooperating with the modules provides a clear view of service dependencies and structures with their critical paths. The GUI is able to display OT network components such as controllers, PLCs, and other systems that extend beyond an end point informational technology component.

The communications messaging detector examines various fields and other information in the communications, including commands, to determine whether that communication is headed to specific OT component that exists beyond the informational technology's endpoint/gateway component(s). The endpoint/gateway component has an IP address. But, the OT components do not have an IP address but still can be displayed along with their associated traffic and commands going to those OT components (see FIG. 6).

Figure 6:
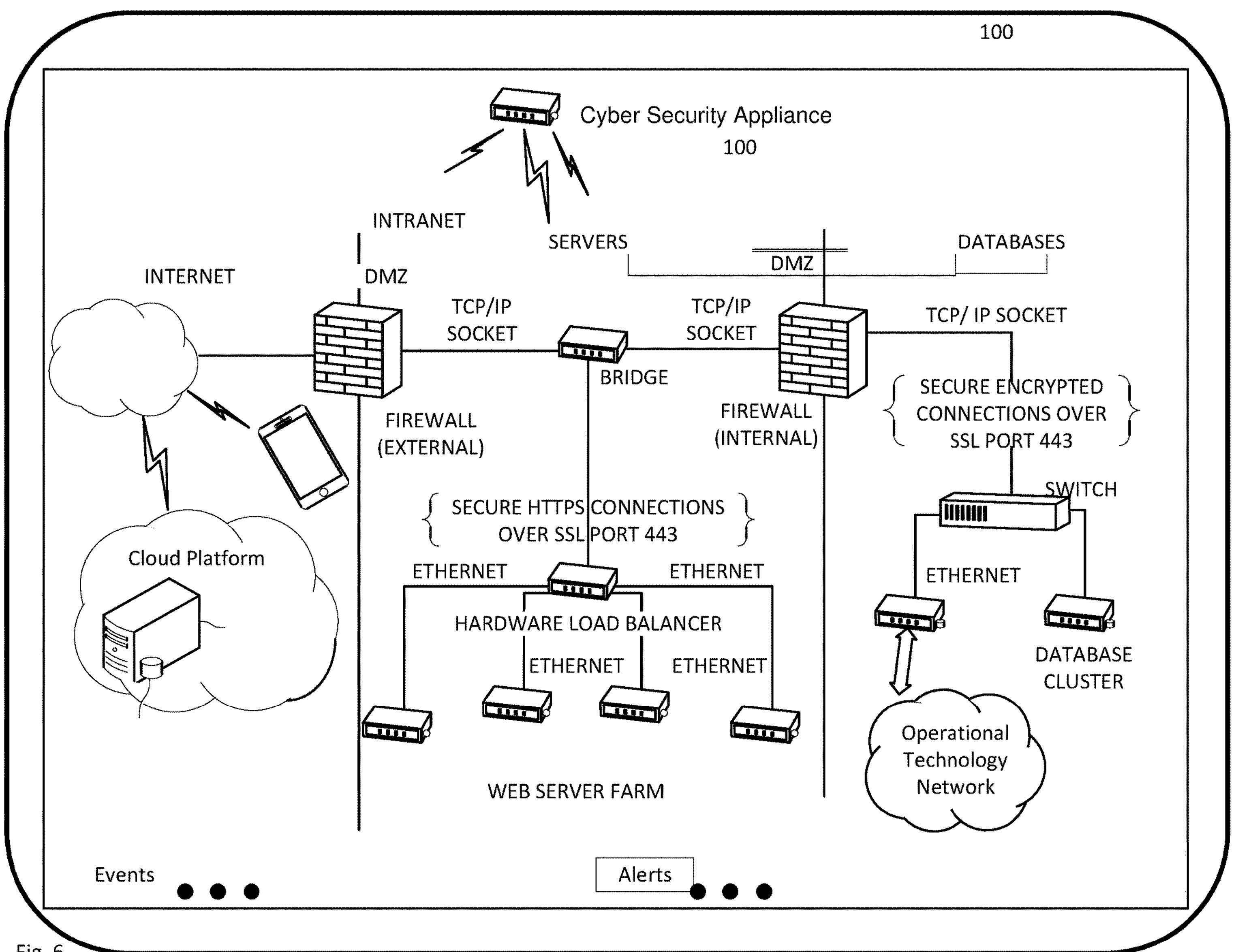
FIG. 6 illustrates a block diagram of an embodiment of an example OT network in connection with the informational technology network under analysis as displayed by an embodiment of the GUI.

FIG. 6 illustrates a block diagram of an embodiment of an example OT network in connection with the informational technology network under analysis as displayed by an embodiment of the GUI. As discussed, the OT components do not have an IP address but are still individually identifiable and then displayable by the GUI. Thus, both components of the information technology network with IP addresses as well as identifiable OT network components without IP addresses can be displayed on a common display screen to allow a viewer to see both of the components on the common display screen. The GUI of the cyber security appliance 100 shows i) components of the OT network along with components of an information technology network and ii) detailed data flows and commands that those network components are receiving when one or more abnormal behaviors are detected.

The GUI provides an unprecedented view into dynamic network activity across the most complex OT and informational technology networks. With the implementation of pivoting views, the GUI gives the ability to quickly investigate events, which is essential as organizations will have limited time to discover and confirm the extent of an issue before they must report it.

As discussed, the GUI shows both i) all devices with IP addresses on the informational technology network as well as uniquely identifiable devices beyond an endpoint IP address. This is achieved by analyzing communication packet information and other information in specific fields to decipher what uniquely identifiable device, beyond endpoint IP address, each communication is intended for.

As discussed, a communications messaging detector analyzes and understands content, including meta data, and fields in OT protocols as well as a TCP/IP used by the information technology network. The communications messaging detector can passively ingesting network data via i) a SPAN port or ii) an inline network tap in order to monitor the behavior of each component in the information technology network especially the end point gateways feeding into the operation technology network. The OT module is able to "see through" end point IP gateways to older OT networks (e.g. Serial lines) and map them onto the user interface for display on a display screen.

The cyber threat module, GUI, and the OT module cooperate to identify all forms of 'abnormal' informational technology including unauthorized accesses by external services, unauthorized devices, repurposed internal servers, and unexpected services; and then, display these potential abnormalities to operators via the 3D GUI.

Figure 7:
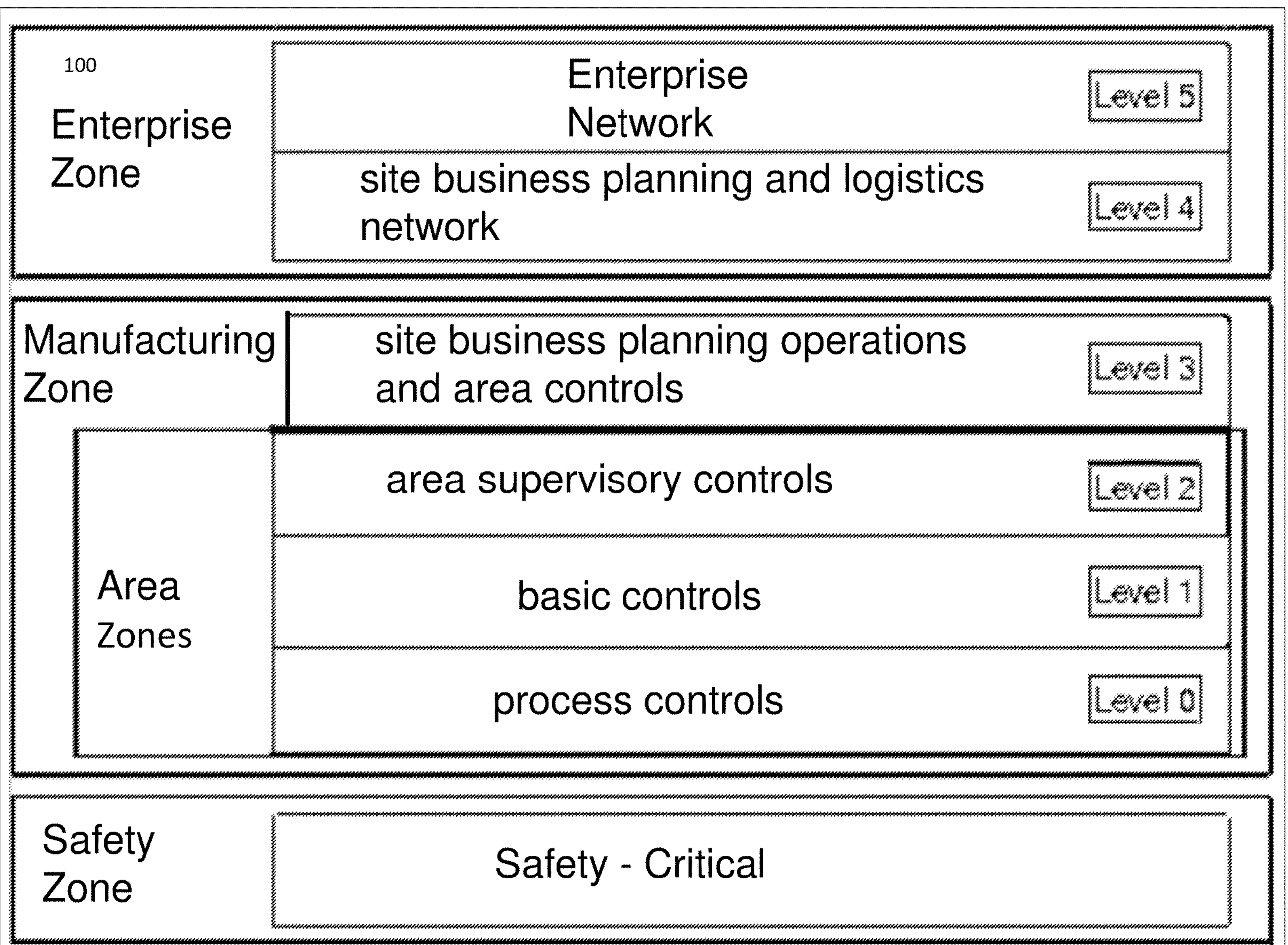
FIG. 7 illustrates a block diagram of an embodiment of an example different configurations for subsets of, or zones, within the operational technology network, where in these different subsets and zones, permissions for the autonomous response module to autonomously take the response to counter the cyber threat without the need for a human to approve the response i) when the cyber threat is detected, can differ in each different zone and ii) a range of allowed responses can also differ in each different zone, iii) and a set of allowed responses can also differ in each different zone, and iv) any combination of these.

FIG. 7 illustrates a block diagram of an embodiment of an example different configurations for subsets of, or zones, within the operational technology network, where in these different subsets and zones, permissions for the autonomous response module to autonomously take the response to counter the cyber threat without the need for a human to approve the response i) when the cyber threat is detected, can differ in each different zone and ii) a range of allowed responses can also differ in each different zone, iii) and a set of allowed responses can also differ in each different zone, and iv) any combination of these. The permissions for the autonomous response module to autonomously take the response to counter the cyber threat can differ in more sensitive and risky zones of the OT network.

The example OT network has multiple zones of differing risks and criticality. For example, an enterprise network zone may include the enterprise network and the site business planning and logistics network. A manufacturing zone may include the site manufacturing operations' i) area controls, ii) basic controls, and iii) a process controls, where all three are areas are within the manufacturing zone. A safety zone may include safety critical components. The process control network can include different levels of process controls including supervisory controls and basic controls in the manufacturing zone and controls for safety critical components in the safety zone. Another zone might be the corporate network zone and boundary management. Another zone may be external communications with customers, suppliers, etc. in the public domains. Another zone may be remote access to these various zones.

Thus, the user interface is configurable to program in different responses and authorized autonomous responses in different zones for the OT network, those zones comprising subsets of the devices in the network or user defined tags. In these different zones, the permissions for the autonomous response module, to autonomously take the response to counter the cyber threat without the need for a human to approve the response when the cyber threat is detected, can differ in each different zone. Each zone can be programmed to have the pre-approved autonomous response for a similar cyber threat to be different than in another zone, such as a least sensitive and risky zone. The pre-approved autonomous responses are programmably adjusted appropriately for differing risks and requirements in more sensitive and risky zones of the OT network, such as the safety zone, than in a less risky zone, such as the remote access zone. Each of these zones can be matched, if so desired, to a different autonomous response strategy as part of their different overall security requirements.

The autonomous response module allows an overall organizational approach to risk management. As discussed, organizations rely on both their OT networks and their business information technology networks in order to deliver services.

There are two available classes of response mechanism, being direct and indirect. In the first case, the cyber security appliance 100 takes direct action to block or disrupt the unwanted activity, for example by introducing reset instructions into a TCP connection that cause the endpoints to shut it down or pushing a dedicated block instruction into an in-line firewall. In the second case, the cyber security appliance 100 advertises the unwanted activity and another third-party device (or devices) take action to disrupt it, for example an in-line firewall could read a description of an unwanted connection passing through it and block all further packets within it. The first case requires the cyber security appliance 100 to be able to directly affect the monitored network, while the second does not.

In OT networks there are strong reasons that the indirect method might be preferred and the direct method disallowed. Modern OT networks are usually architected with multiple security zones, and often in layers. Between every pair of zones that communicate there is often an in-line firewall, and there is a difference in how trusted each zone is. With reference to FIG. 7, zones closer to the physical process have a higher trust requirement. Since the activity of cyber security appliance 100 is not closely related to the physical process, it will be placed on the untrusted side of, potentially, multiple transitions into zones requiring higher trust. It is normal to very strictly control any communications originating from a lower trust network into a higher trust one. This does not mix well with the direct action class of responses, which would have to be allowed through multiple trust jumps. It does however mix well with the indirect action class of responses, as devices in higher-trust networks would be communicating with the lower-trust cyber security appliance 100 on their own terms to retrieve information about the unwanted activity.

For example, an anomalous event as determined by the cyber-threat module might cause the autonomous response module to decide that a particular connection between two security zones deep within the OT network is unwanted. It may be configured not to attempt to directly terminate the connection, as any instructions to do so would not be permitted through the in-line firewalls in between. Instead it makes information about the unwanted connection available to third-party devices that may wish to block it, for example by posting the IP addresses into a named list accessible through a web server. Third-party firewalls may connect to this web server and read that IP addresses from the named list. These connections would normally be permitted if initiated by the firewalls in higher security zones, even if they have to pass through other intermediate firewalls in between successively lower trust zones. The IP address can be entered into a "dynamic list" within the firewall depending on the named list it was found in (note: different firewalls use different terminology for conceptually similar "dynamic lists". The firewall maintainer can then configure appropriate firewall "deny" rules to block the unwanted connection, as notified by IP addresses appearing in a periodic update to the dynamic list. This has the additional benefit of allowing the firewall maintainer complete control over the range of possible blocking actions. In many cases this will be a more appropriate person for determination and maintenance of these actions than the administrator of the cyber security appliance 100, who may belong to a completely different business unit.

The machine-learning models can train to understand all aspects of the networks including documents, controls access to systems and functions supporting the delivery of essential services. Rights or access granted to specific users or functions should be understood and well managed.

The autonomous response module can autonomously respond to attack/unusual behavior in an automatic way that prevents the attack/unusual behavior from progressing further. For example the autonomous response system can mandate that only normal pattern-of-life activities can successfully occur until a human has verified that the unusual behavior is allowed, or should be blocked indefinitely.

Machine learning can be used to figure out what suggestions to make on the type of autonomous actions to take counter a potential cyber threat the series of those actions.

Importantly, deploying the cyber security appliance 100 is not just an on/off switch or a large fixed step change. Various aspects can be architected so that in different areas of the network, or for different use cases, the autonomous response module has its options limited to match a specific local risk appetite.

The user interface can be used to program the autonomous response module to set responses of controlling connectivity and physical access. For example, in parts of the network where risk assessment deems it appropriate, the autonomous response module can autonomously prevent unauthorized devices from acting.

With the user interface it is easily configurable to configure the autonomous response module to control traffic into and out of an area of the network, without affecting the area's internal traffic. This allows network zones where risk decisions do not favor the deployment of dynamic blocking to still be protected from the outside cyber threats.

The autonomous response module can be configured to take specific limited options, such as block TCP connections as well as configure specific areas and scenarios requiring human approval or intervention before generating the response to the cyber threat in that zone. The autonomous response module can take actions based on both severity of threat and actual impact on the industrial network of taking that action, where the real world physical consequences on a product in the industrial environment of taking an action can ruin or damage the product compared to shutting down access to a port in the digital information technology environment.

Note, the autonomous response module can also take targeted autonomous actions on components in the OT (Industrial) environment facilitated by machine-learning models. For example, the autonomous response module can take a first minor corrective action and if that does not counter the cyber threat, then start escalating the types of corrective actions to ultimately shutting down equipment.

The autonomous response module can use models trained on OT activity with different sets of suggestions on what allowed actions the system could take without unacceptable effects in the industrial OT network. When authorized by an administrator, the autonomous response module may take these action directly when a cyber threat is detected. The autonomous response module provides active defense by autonomously responding to threats detected by comparisons to the machine-learning models. Using the machine-learning models' rich understanding of normal behavior for devices and users, then unusual activity can be targeted and disrupted with confidence without impacting the normal functioning of the network.

Again, the machine-learning models can train on threats and effective responses. For example, the machine-learning models may determine that a main tool to protect the OT network from a malicious software in the informational technology network is to block TCP connections. The models are trained with previous effective responses to previously known malware and insider threats and can reason similar responses to previously unknown threats. Blocking ransomware infections is a frequent occurrence of note in deployments, as it highlights the benefits of the real-time responsiveness against threats that are a race against the clock to remediate. Organizations using the cyber security appliance 100 likely already have a set of known risks they are looking to mitigate, here are a few common examples that the models have been trained on:

- a new device appears on network and begins interacting with OT systems without any previous indication this would be happening; engineering workstation begins performing OT reconnaissance scans; an OT application server starts beaconing to a rare internet destination; an Engineering workstation infected with ransomware attacks application server file shares HMI infected with mining malware, drastically impacting operational performance; etc.

The autonomous response module allows both fully autonomous response and human-confirmation modes, where the system decides how to respond but waits on authorization from the security team to take action. This can be selected on a per-model, or per-use-case basis. In order to build confidence in a deployment or in a particular model, the autonomous response module can also log the actions it wanted to take without performing them.

Machine Confidence

Again, the autonomous response module can be set to log its intended actions rather than take them. This can be used to build confidence in a deployment or a particular model before trusting it in production. Combined with rigorous change control procedures this is a very strong risk mitigation. The choice on a per-model basis to permit fully autonomous response or to wait for human confirmation grants additional flexibility and risk control.

Referring back to FIG. 5, the cyber security appliance 100 containing the autonomous response module, the OT module, and the comparator module can be optionally constructed for installation in an industrial environment with a protective housing and cooling components to allow the cyber security appliance 100 to be installed in industrial environments where an environmental climate control is not heavily regulated compared to a climate controlled environment of rack mounted equipment in a datacenter. The cyber security appliance is constructed for installation in an industrial environment with a protective housing and cooling components to allow the cyber security appliance to be installed in more hazardous locations where dust, moisture, temperature and vibration require ruggedization.

The Basics of an Example Cyber Threat Defense System

Figure 8:
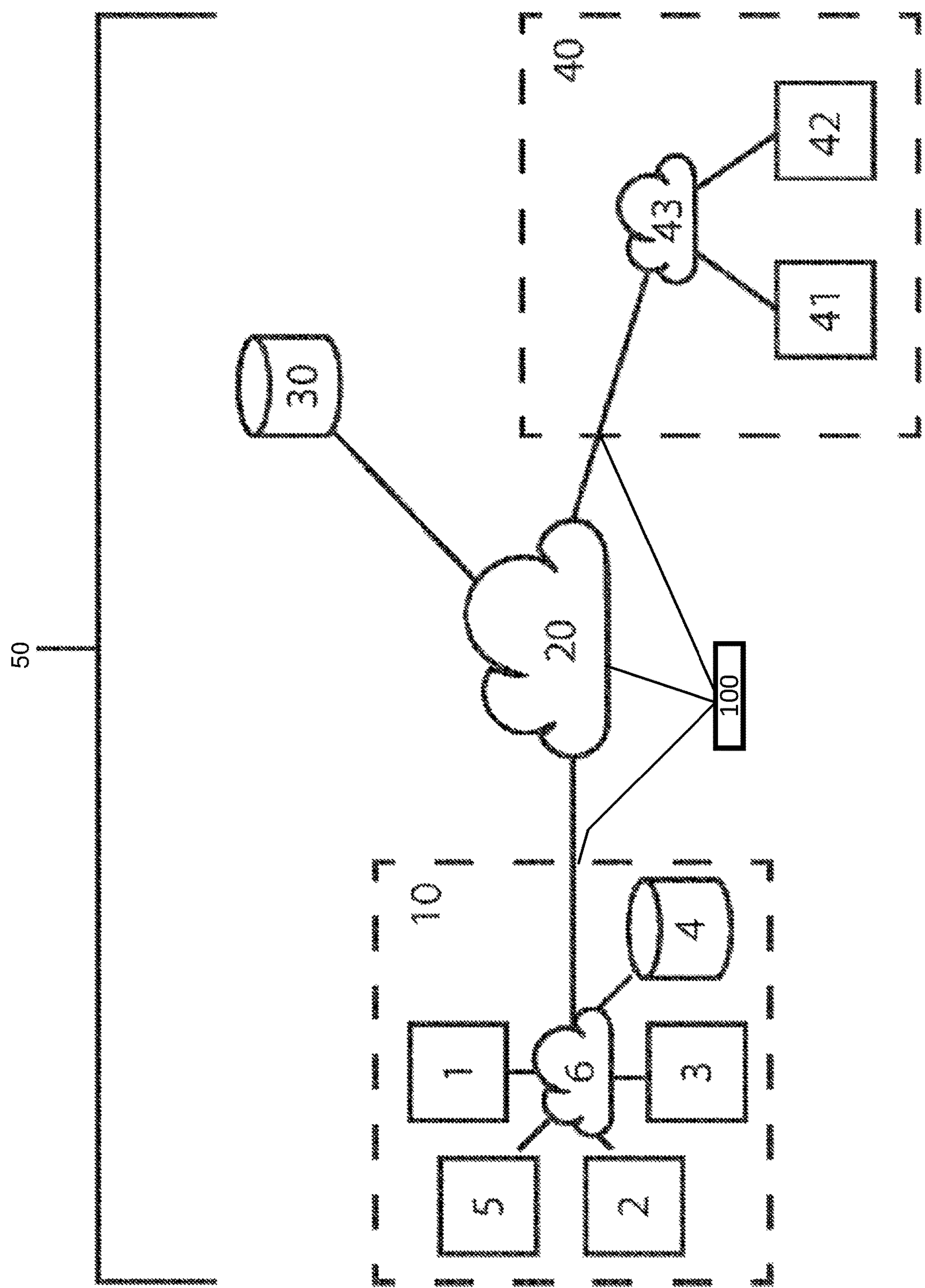
FIG. 8 illustrates an example cyber threat defense system, including the cyber security appliance and its extensions, protecting an example network.

FIG. 8 illustrates an example cyber threat defense system, including the cyber security appliance and its extensions, protecting an example network. The example network FIG. 8 illustrates a network of computer systems 50 using one or more cyber security appliances 100. The system depicted by FIG. 8 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 8.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine-learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine-learning is at the forefront of the fight against automated and human-driven cyber-threats, overcoming the limitations of rules and signature-based approaches:

- The machine-learning learns what is normal within a network—it does not depend upon knowledge of previous attacks.
- The machine-learning thrives on the scale, complexity and diversity of modern businesses, where every device and person is slightly different.
- The machine-learning turns the innovation of attackers against them—any unusual activity is visible.
- The machine-learning constantly revisits assumptions about behavior, using probabilistic mathematics.
- The machine-learning is always up to date and not reliant on human input. Utilizing machine-learning in cyber security technology is difficult, but when correctly implemented it is extremely powerful. The machine-learning means that previously unidentified threats can be detected, even when their manifestations fail to trigger any rule set or signature. Instead, machine-learning allows the system to analyze large sets of data and learn a 'pattern of life' for what it sees.

Machine learning can approximate some human capabilities to machines, such as:

- Thought: it uses past information and insights to form its judgments;
- Real time: the system processes information as it goes; and
- Self-improving: the model's machine-learning understanding is constantly being challenged and adapted, based on new information.

New unsupervised machine-learning therefore allows computers to recognize evolving threats, without prior warning or supervision.

Unsupervised Machine-Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine-learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine-learning on cyber security is transformative:

- Threats from within, which would otherwise go undetected, can be spotted, highlighted, contextually prioritized and isolated using these algorithms.
- The application of machine-learning has the potential to provide total network visibility and far greater detection levels, ensuring that networks have an internal defense mechanism.
- Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, a closer look at the cyber threat defense system's machine-learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access; Data access; Timings of events; Credential use; DNS requests; and other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

Analyzes behavior in the context of other similar devices on the network;

Algorithms identify naturally occurring groupings of devices—impossible to do manually; and Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:

Raw network IP traffic captured from an IP or other network TAP or SPAN port;

Machine generated log files;

Building access ("swipe card") systems;

IP or non IP data flowing over an ICS distributed network;

Individual machine, peripheral or component power usage;

Telecommunication signal strength; and/or

Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:

The number of bytes of data entering or leaving a networked device per time interval.

File access.

The commonality/rarity of a communications process

Invalid SSL certification.

Failed authorization attempt.

Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.

The number of internal link-local IP Broadcast requests originating from a networked device.

The size of the packet payload data.

The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc.

Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine-learning/AI to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a 3$^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. The functionality performed by one or modules may be combined into a single module, where logically possible, and a modules functionality may be split into multiple modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cyber security appliance, comprising:

a processor and a memory, which further comprise:

an operational technology module configured to receive data on an operational technology network from i) a set of probes, ii) by passive traffic ingestion through a location within the network, and iii) any combination of both, where the operational technology module is also configured to reference i) one or more machine-learning models, using machine-learning and artificial intelligence (AI) algorithms, that are trained on a normal pattern of life of users of the operational technology network, ii) one or more machine-learning models, using machine-learning and AI algorithms, that are trained on a normal pattern of life of devices in the operational technology network, and iii) one or more machine-learning models, using machine-learning and AI algorithms, that are trained on a normal pattern of life of controllers in the operational technology network; and a comparator module configured to cooperate with the operational technology module to compare the received data on the operational technology network to the normal pattern of life of any of the users, devices, and controllers to detect anomalies in the normal pattern of life for these entities in order to detect a cyber threat; and an autonomous response module configured to respond to counter the cyber threat, and a user interface to program the autonomous response module.

2. The apparatus of claim 1, where the autonomous response module is configured to i) to merely make a suggested response to take to counter the cyber threat that will be presented for explicit authorization when the cyber threat is detected or ii) to autonomously take a response to counter the cyber threat without a need for a human to approve the response when the cyber threat is detected.

3. The apparatus of claim 2, where the user interface is further configured to program in different configurations for subsets of, or zones, within the operational technology network, wherein these different subsets and zones, permissions for the autonomous response module to autonomously take the response to counter the cyber threat without the need for a human to approve the response i) when the cyber threat is detected, can differ in each different zone and ii) a range of allowed responses can also differ in each different zone, iii) and a set of allowed responses can also differ in each different zone, and iv) any combination of these.

4. The apparatus of claim 2, where the cyber security appliance containing the autonomous response module, the operational technology module, and the comparator module can be constructed for installation in an industrial environment with a protective housing and cooling components to allow the cyber security appliance to be installed in more hazardous locations where dust, moisture, temperature, and vibration require ruggedization.

5. The apparatus of claim 1, further comprising:

an informational technology module configured to monitor data from an informational technology network in order to analyze and integrate both activities occurring in the operational technology network as well as activities occurring in the informational technology network at the same time when analyzing the detected anomalies in the normal pattern of life in order to detect the cyber threat.

6. The apparatus of claim 5, further comprising:

a graphical user interface is configured to display metrics, alerts, and events of both the operational technology network in light of activities occurring in the information technology network on a common display screen to allow a viewer i) to visually contextualize the metrics, alerts, and/or events occurring in the operational technology network in light of the activities occurring in the information technology network on the common display screen, and then ii) to confirm the detected cyber threat.

7. The apparatus of claim 1, further comprising:

a communications messaging detector configured to analyze and understand at least content and fields in two or more of i) a data link, ii) a network protocol, iii) a transport protocol, iv) a session protocol, and v) application layers of networking protocols used in operational technology networks as well as vi) those protocols shared by and used by information technology networks.

8. The apparatus of claim 7, further comprising:

a graphical user interface is configured to cooperate with the communications messaging detector to examine various fields and other header information in the communications to determine whether that communication is headed to a specific operational technology component that exists beyond an endpoint gateway to operational technology components beyond that Internet Protocol address of the endpoint gateway, where the operational technology components do not have an IP address, and then display both components of the information technology network with IP addresses and identifiable operational technology network without IP addresses on a common display screen to allow a viewer to see both the components of the information technology network and components of the operational technology network on the common display screen.

9. The apparatus of claim 1, further comprising:

a graphical user interface configured to show i) components of the operational technology network and components of an information technology network and ii) detailed data flows and commands that those network components are receiving in real time and when an abnormal behavior is detected.

10. The apparatus of claim 1, further comprising:

a cyber threat module configured to compare a chain of one or more of the detected anomalies by referencing one or more machine-learning models trained on, at least, the cyber threat, and where once the normal pattern of life has been learned by the models, then the operational technology module can readily identify the anomalies in the normal pattern of life; and thus, unusual behaviors from the devices, users, or controllers of the operational technology network.

11. A method for cyber security appliance defending an operational technology network, comprising:

receiving data on the operational technology network from i) a set of probes, ii) by passive traffic ingestion through a location within the network, and iii) any combination of both; and referencing i) one or more machine-learning models, that are trained on a normal pattern of life of users of the operational technology network, ii) one or more machine-learning models that are trained on a normal pattern of life of devices in the operational technology network, and iii) one or more machine-learning models that are trained on a normal pattern of life of controllers in the operational technology network; and comparing the received data on the operational technology network to the normal pattern of life of any of the users, devices, and controllers to detect anomalies in the normal pattern of life for these entities in order to detect a cyber threat; and taking a response to counter the cyber threat based on the comparison with an autonomous response module.

12. The method of claim 11, further comprising:

allowing an autonomous response module to respond to counter the cyber threat; and programming the autonomous response module i) to merely make a suggested response to take to counter the cyber threat that will be presented for explicit authorization when the cyber threat is detected or ii) to autonomously take a response to counter the cyber threat without a need for a human to approve the response when the cyber threat is detected.

13. The method of claim 12, further comprising:

programming in different subsets or zones within the operational technology network, where in these different subsets and zones, permissions for the autonomous response module to autonomously take the response to counter the cyber threat without the need for a human to approve the response when the cyber threat is detected can differ.

14. A non-transitory computer readable medium comprising computer readable code operable, when executed by one or more processing apparatuses in the security appliance to instruct a computing device to perform the method of claim 11.

15. The method of claim 11, further comprising:

monitoring data from an informational technology network in order to analyze and integrate both activities occurring in the operational technology network as well as activities occurring in the informational technology network at the same time when analyzing the detected anomalies in the normal pattern of life in order to detect the cyber threat.

16. The method of claim 15, further comprising:

displaying metrics, alerts, and events of both the operational technology network in light of activities occurring in information technology network on a common display screen to allow a viewer i) to visually contextualize the metrics, alerts, and/or events occurring in the operational technology network in light of the activities occurring in the information technology network on the common display screen, and then ii) to confirm the detected cyber threat.

17. The method of claim 11, further comprising:

analyzing and understanding content and fields in two or more of i) a data link protocol, ii) a network protocol, iii) a transport protocol, iv) a session protocol, and v) application layers of networking protocols used in operational technology networks as well as vi) those protocols shared by and used by information technology networks.

18. The method of claim 17, further comprising:

examining various fields and other header information in the communications to determine whether that communication is headed to a specific operational technology component that exists beyond an endpoint gateway to operational technology components beyond that Internet Protocol address of the endpoint gateway, where the operational technology components do not have an IP address, and then display both components of the information technology network with IP addresses and identifiable operational technology network without IP addresses on a common display screen to allow a viewer to see both the components of the information technology network and components of the operational technology network on the common display screen.

19. The method of claim 11, further comprising:

using a graphical user interface to show, in real time, i) components of the operational technology network and components of an information technology network and ii) detailed data flows and commands that those network components are receiving when an abnormal behavior is detected.

20. The method of claim 11, further comprising:

comparing a chain of one or more of the detected anomalies by referencing one or more machine-learning models trained on, at least, the cyber threat, and where once the normal pattern of life has been learned by the models, then the operational technology module can readily identify the anomalies in the normal pattern of life; and thus, unusual behaviors from the devices, users, or controllers of the operational technology network.

* * * * *